(12) United States Patent
Hermansson et al.

(10) Patent No.: US 12,041,876 B2
(45) Date of Patent: Jul. 23, 2024

(54) BATTERY ADAPTER PLATE FOR WHEELED OUTDOOR POWER EQUIPMENT

(71) Applicant: HUSQVARNA AB, Huskvarna (SE)

(72) Inventors: Thomas Hermansson, Huskvarna (SE); Per Rydberg, Jönköping (SE)

(73) Assignee: HUSQVARNA, Huskvarna (SE)

( * ) Notice: Subject to any disclaimer, the term of this patent is extended or adjusted under 35 U.S.C. 154(b) by 946 days.

(21) Appl. No.: 17/008,790

(22) Filed: Sep. 1, 2020

(65) Prior Publication Data
US 2021/0153431 A1    May 27, 2021

(30) Foreign Application Priority Data
Nov. 21, 2019  (SE) .................................. 1951334-0

(51) Int. Cl.
| A01D 34/78 | (2006.01) |
| A01D 34/68 | (2006.01) |
| A01D 69/02 | (2006.01) |
| B60L 53/80 | (2019.01) |
| A01D 101/00 | (2006.01) |

(52) U.S. Cl.
CPC ......... *A01D 34/78* (2013.01); *A01D 34/6806* (2013.01); *B60L 53/80* (2019.02); *A01D 2101/00* (2013.01)

(58) Field of Classification Search
CPC ......... A01D 34/78; A01D 69/02; B60L 53/80; H01R 29/00; H01R 11/282
USPC ........................................ 439/638, 500, 504
See application file for complete search history.

(56) References Cited

U.S. PATENT DOCUMENTS

| 2,909,885 A * | 10/1959 | Smith ..................... A01D 34/78 |
| | | 56/11.9 |
| 5,819,513 A * | 10/1998 | Braun .................. A01D 34/828 |
| | | 56/11.9 |

(Continued)

FOREIGN PATENT DOCUMENTS

| AU | 2013205965 B2 | 12/2017 |
| CN | 201097497 Y | 8/2008 |

(Continued)

OTHER PUBLICATIONS

FR Jones and Son Ltd., "Stihl RMA 339 C battery push four wheeled lawn mower (37cm cut)," Retrieved from the Internet URL: https://www.frjonesandson.co.uk/products/stihl-rma-339-c-battery-wheeled-lawn-mower-shell-only-37cm-cut/, 5 Pages, Retrieved Date Oct. 18, 2019.

(Continued)

*Primary Examiner* — Alicia Torres
(74) *Attorney, Agent, or Firm* — Burr & Forman LLP (57) ABSTRACT

A lawn mower may include a blade housing configured to house a blade assembly, a powerhead configured to selectively operate the blade assembly responsive to application of power from one or more batteries, a battery receptacle operably coupled to the powerhead and configured to receive the one or more batteries, and a battery adapter configured to be operably coupled to the lawn mower and to a backpack battery to enable the powerhead to receive power from the backpack battery in addition to or as an alternative to one of the one or more batteries when the backpack battery is removed from a backpack harness and mated with the battery adapter.

20 Claims, 6 Drawing Sheets

(56) References Cited

U.S. PATENT DOCUMENTS

| | | | |
|---|---|---|---|
| 6,666,008 B2 * | 12/2003 | Iida | A01D 34/78 56/11.9 |
| 8,935,907 B2 | 1/2015 | Abe et al. | |
| 10,980,173 B2 * | 4/2021 | Becke | A01D 69/02 |
| 2003/0159417 A1 | 8/2003 | Dettmann | |
| 2012/0321912 A1 | 12/2012 | Hachisuka et al. | |
| 2019/0288255 A1 | 9/2019 | Kubota et al. | |
| 2020/0220123 A1 * | 7/2020 | Ehrler | G01K 1/026 |

FOREIGN PATENT DOCUMENTS

| | | | | |
|---|---|---|---|---|
| CN | 203423971 U | | 2/2014 | |
| CN | 102581825 B | | 5/2014 | |
| CN | 104641784 A | * | 5/2015 | A01D 34/78 |
| CN | 204598689 U | | 9/2015 | |
| CN | 105940853 A | | 9/2016 | |
| CN | 107612087 A | | 1/2018 | |
| CN | 108076801 A | | 5/2018 | |
| EP | 2875712 B1 | | 10/2016 | |
| EP | 2819207 B1 | | 9/2017 | |
| EP | 3326444 A1 | | 5/2018 | |
| EP | 3331056 A1 | | 6/2018 | |
| EP | 3331057 A1 | | 6/2018 | |
| JP | 2013004228 A | | 1/2013 | |
| WO | 2016/074239 A1 | | 5/2016 | |
| WO | 2017/013602 A1 | | 1/2017 | |

OTHER PUBLICATIONS

Beyman, A., "Running a Cordless Electric Lawn Mower on an eBike Battery?," Retrieved from the Internet URL: https://medium.com/@alexbeyman/running-a-cordless-electric-lawn-mower-on-an-ebike-battery-6c06e84f3993, 3 Pages, Jul. 17, 2019.

Jacobs, C., "Viking battery mower to Stihl AR backpack adapter," Retrieved from the Internet URL: https://hackaday.o/project/26238-viking-battery-mower-to-stihl-ar-backpack-adapter, 3 Pages, Apr. 8, 2017.

Marvin, J., "Kobalt 80-volt Brushless Lithium Ion 21-in Cordless Electric Lawn Mower", Retrieved from the Internet URL: https://www.youtube.com/watch?v=X2eLgZTi3QA, Jul. 22, 2018.

* cited by examiner

BATTERY ADAPTER PLATE FOR WHEELED OUTDOOR POWER EQUIPMENT

TECHNICAL FIELD

Example embodiments generally relate to wheeled outdoor power equipment and, more particularly, relate to a wheeled device that is battery powered, and to an adapter that can enable augmentation of onboard batteries in a simple and intuitive way that, for example, eliminates any need for the operator to carry the augmenting batteries on his/her back.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Robotic mowers can be even smaller, and operate autonomously. Meanwhile, at the other end of the spectrum, riding lawn mowers, such as lawn tractors, can be quite large.

Although each of these different types of mowers clearly has significant differences in weight, size, cost and sometimes also capabilities, they are all generally constructed around the same basic principle of operation. In this regard, a power source is used to enable a power unit (e.g., a motor or engine) to provide the motive force that causes blades to rotate on a shaft and cut grass. Gasoline or petrol engines had been dominant means by which to provide the motive force for rotating the blades for many years. However, more recently, battery powered devices have been becoming more prominent.

Practical limitations had initially effectively restricted battery power to applications in smaller devices such as robotic mowers. However, battery technology advances gradually enabled walk behind mowers to also be battery powered. Thus, a number of devices have hit the market, which include a standard onboard battery that is rechargeable and is used to power the mower. These devices will have a range or operating time that is limited by the capacity of the battery. Thus, it became desirable to enable the onboard batteries to be augmented by the assistance of external battery sources. Since certain other devices, which are also battery powered, include batteries that are transported on the operator's back in a backpack harness, a natural way to extend battery range or operating time has been to provide a cord that can connect the backpack battery to the lawn mower to augment the onboard battery. This mechanism, although effective for its main purpose, necessarily tethers the operator to the lawn mower via the cord. Thus, using the device under these circumstances has inherent drawbacks that may be desirable to eliminate.

BRIEF SUMMARY OF SOME EXAMPLES

Some example embodiments may therefore provide for improved way to use external batteries to augment onboard batteries. For example, an adapter can be provided to enable the external battery to be supported on the mower or other wheeled outdoor power equipment itself, and be electrically connected thereto without the cord mentioned above.

In an example embodiment, a lawn mower may be provided. The lawn mower may include a blade housing configured to house a blade assembly, a powerhead configured to selectively operate the blade assembly responsive to application of power from one or more batteries, a battery receptacle operably coupled to the powerhead and configured to receive the one or more batteries, and a battery adapter configured to be operably coupled to the lawn mower and to a backpack battery to enable the powerhead to receive power from the backpack battery in addition to or as an alternative to one of the one or more batteries when the backpack battery is removed from a backpack harness and mated with the battery adapter.

In another example embodiment, a battery adapter for battery powered, wheeled outdoor power equipment is provided. The battery adapter may include a powerhead interface disposed on a first side of the battery adapter, and a backpack battery interface disposed on a second side of the battery adapter, which is opposite the first side. The battery adapter may be configured to be operably coupled to the outdoor power equipment and to the backpack battery to enable a powerhead of the outdoor power equipment to receive power from the backpack battery in addition to or as an alternative to an onboard battery when the backpack battery is removed from a backpack harness and mated with the battery adapter.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
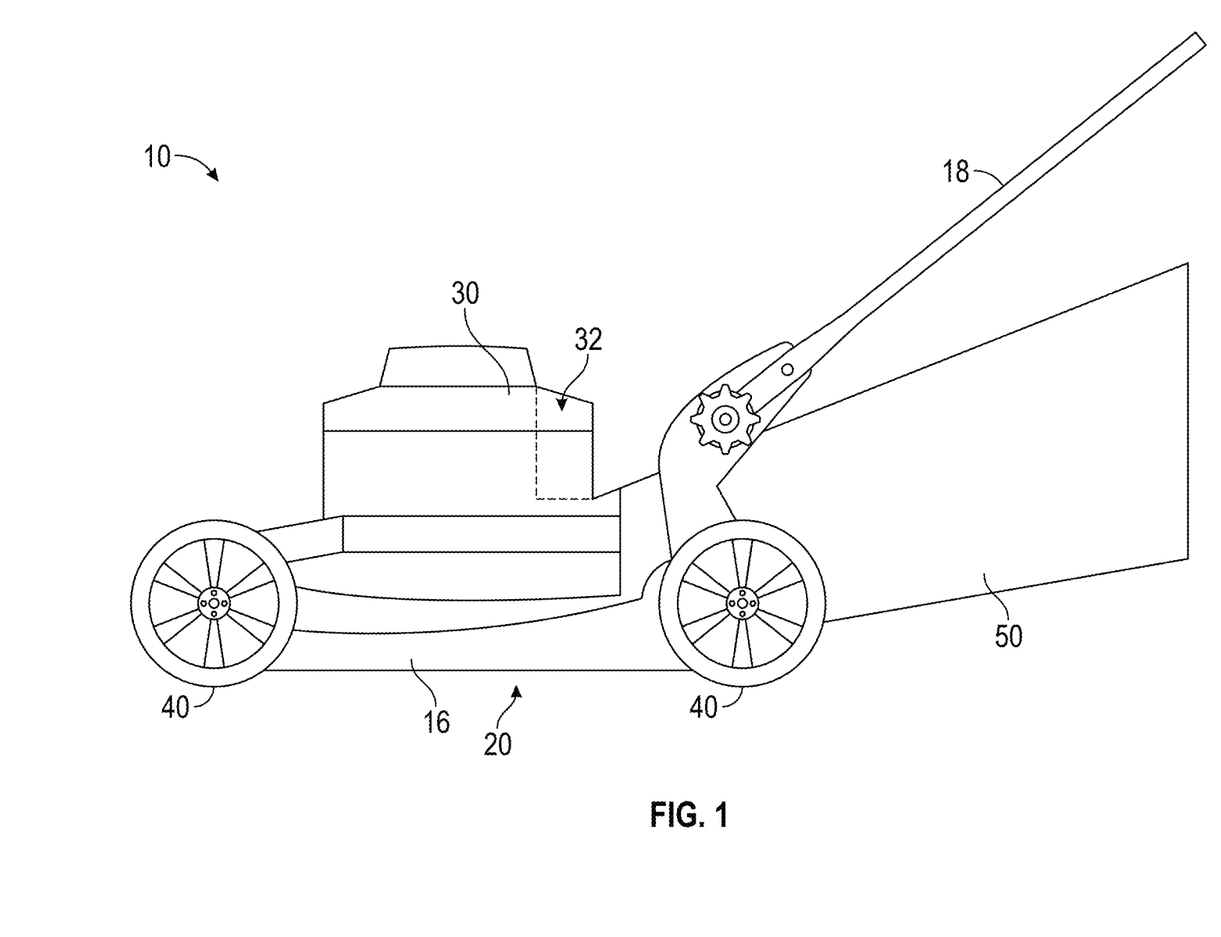
FIG. 1 illustrates a side view of a lawn mower according to an example embodiment.

FIG. 1 illustrates a side view of a walk-behind lawn mower 10 of an example embodiment. However, it should be appreciated that the walk-behind lawn mower 10 is just one example of a wheeled outdoor power equipment device on which an example embodiment may be practiced. In other examples, the outdoor power equipment device could be a riding lawn mower or walk-behind outdoor power equipment of any type. For this example, an operator may be located at an operator station located behind the lawn mower 10.

The lawn mower 10 of FIG. 1 includes a blade housing 16 to which a handle assembly 18 is attached. The operator station may be at a distal end of the handle assembly 18 relative to the blade housing 16 (i.e., off the page to the right in the view shown in FIG. 1). The blade housing 16 may house a blade assembly 20 (see also FIG. 2) having one or more rotatable cutting blades. The cutting blades may be suspended above the ground via one or more instances of a rotatable shaft (e.g., a drive shaft—not shown in FIG. 1) that may be turned responsive to operation of a powerhead 30, such as an electric motor. Operation of the powerhead 30 may be initiated by a key, switch, electronic ignition or other similar device. In some cases, the key, switch, electronic ignition or the like may be located at the powerhead 30. However, in other cases, the key, switch, electronic ignition or the like may be located at the operator station.

The powerhead 30 of some example embodiments may be an electric motor that is battery powered via an onboard battery 32. The onboard battery 32 may be disposed in a housing or power receptacle located at a portion of the powerhead 30. The onboard battery 32 may be removable and/or rechargeable. Thus, for example, the onboard battery 32 may be removed and charged apart from the lawn mower 10. Thereafter, when fully charged, the onboard battery 32 may be placed back in the housing or power receptacle and be used to supply energy to the powerhead 30 for powering the blade assembly 20 to cut grass. Alternatively, a charging cord (not shown) or other charging system component could be attached to the onboard battery 32 to permit charging thereof while the onboard battery 32 remains in the housing or power receptacle so that removal of the onboard battery 32 is not required.

The onboard battery 32 may include a contact assembly (not shown in FIG. 1), which may include electrical contacts that are configured to mate with corresponding contacts disposed in the housing or power receptacle of the powerhead 30 for discharging the onboard battery 32 to provide energy to the powerhead 30. The contact assembly may also mate with a charger or a charge adapter that is used to connect the onboard battery 32 to an external power source (e.g., mains power) to charge the onboard battery 32.

The lawn mower 10 may include a mobility assembly on which a substantial portion of the weight of the lawn mower 10 may rest when the lawn mower 10 is stationary. The mobility assembly may also provide for movement of the lawn mower 10. In some cases, the mobility assembly may be driven via power from the powerhead 30 that may be selectively provided to ground engaging wheels 40, which make up the mobility assembly. In other cases, the wheels 40 may simply roll responsive to a push force from the operator. In some examples, the wheels 40 may be adjustable in their respective heights. Adjusting the height of the front wheels and/or the back wheels may be employed in order to provide a level cut and/or to adjust the height of the cutting blade. In some embodiments, a local wheel height adjuster may be provided at the front wheels and/or the back wheels. However, in other embodiments, remote wheel height adjustment may also or alternatively be possible (e.g., from the operator station or elsewhere on the lawn mower 10).

Rotation of the cutting blades of the cutting assembly 20 may generate grass clippings, and/or other debris that may be ejected from the blade housing 16. In some cases, the clippings/debris may be ejected from a side or rear of the blade housing 16. When a rear discharge is employed, many such lawn mowers may employ a collector 50 to collect discharged clippings/debris. However, collectors may also be used for side discharge models in some cases. The collector 50 may be removable to enable the operator to empty the collector 50, and the collector 50 may be made of fabric, plastic or other suitable materials.

As noted above, example embodiments may also be practiced with wheeled outdoor power equipment other than lawn mowers and riding lawn mowers. In such cases, the components discussed above may be included (or modified) along with other components to form the other outdoor power equipment device or riding lawn mower. Thus, the components of FIG. 1 are merely provided as non-limiting examples of some of the components that may be common to lawn mowers and outdoor power equipment that may employ the technology associated with example embodiments.

Figure 2:
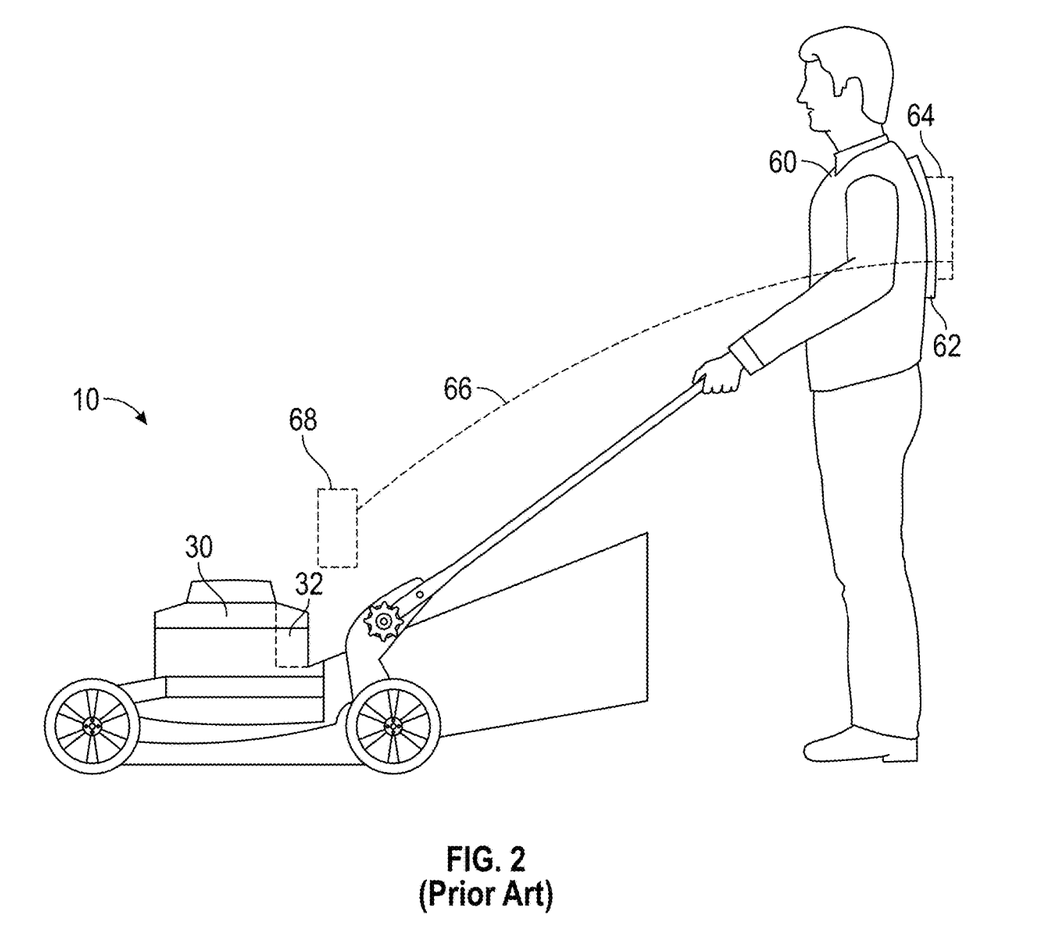
FIG. 2 illustrates the lawn more configured to receive power from a conventional backpack battery.

FIG. 2 illustrates a side view of a prior art system that example embodiments aim to improve upon. In this regard, the lawn mower 10 of FIG. 2 includes the powerhead 30 and onboard battery 32 described above. An operator 60 is wearing a backpack harness 62 via which an external battery (i.e., external relative to the lawn mower 10) can be housed and/or transported. The external battery may be a standard backpack battery 64, which includes a housing and corresponding interfaces that enable operability of the backpack battery 64 with the backpack harness 62 and with a device that is to be powered via the backpack battery 62. In a typical case, the backpack battery 64 may include a cord 66 that operably couples the backpack battery 64 to a dummy battery 68 (sometimes referred to as a "backpack adapter"— not to be confused with the battery adapter or battery adapter plate discussed below), and the dummy battery 68 is inserted into the device that is to be powered. (Of note, the dummy battery 68 shown in FIG. 2 is not yet inserted into the device.) The dummy battery 68 therefore includes electrical interfaces (e.g., a contact assembly) and a physical structure that enables the dummy battery 68 to plug into a battery receptacle of the device that is to be powered. Thus, in this case, for example, the onboard battery 32 could be removed and the dummy battery 68 could be placed in the lawn mower 10 instead of the onboard battery 32. However, some examples of the lawn mower 10 may be configured to include two battery pockets or receptacles. In such cases, two instances of the onboard battery 32 could be used. By employing the backpack battery 64 to power the lawn mower 10, one of the instances of the onboard battery 32 could be replaced by the dummy battery 68 in one of the pockets or receptacles, and the other pocket or receptacle could still include the onboard battery 32. However, when the backpack battery 64 is used (either alone or with the onboard battery 32), the cord 66 necessarily tethers the operator 60 and the backpack harness 62 to the powerhead 30 and the lawn mower 10.

Figure 3:
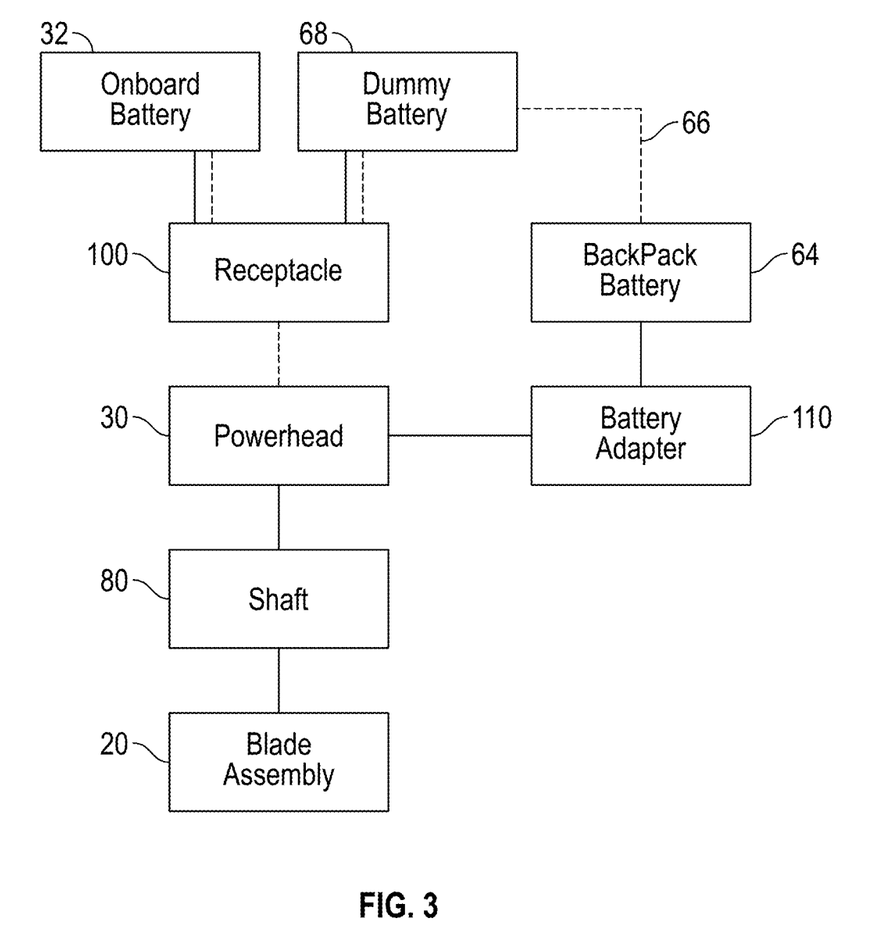
FIG. 3 illustrates a block diagram of a system for avoiding the limitations associated with the arrangement of FIG. 2 in accordance with an example embodiment.

As noted above, the contact assembly of the dummy battery 68 may include electrical contacts that are configured to mate with corresponding contacts disposed on the powerhead 30 (e.g., in a battery pocket or receptacle). The powerhead 30 may then be powered by the backpack battery 64 (with or without the onboard battery 32) via the cord 66 and the dummy battery 68, while the operator wears the backpack battery 64 on his/her back may be similar in function (and perhaps also form) to the contact assembly described above for the discharging and charging of the onboard battery 32. The cord 66 may be single unitary cord, or may be split into sections that connect to each other via a coupling (e.g., corresponding plugs). However, whether the cord 66 is one piece or two, the cord 66 necessarily must continuously connect the backpack battery 64 to the dummy battery 68 and extend therebetween. Thus, when the dummy battery 68 is inserted into the lawn mower 10 or powerhead 30, the cord 66 creates the undesirable tethering mentioned above. Accordingly, it may be desirable to provide a convenient mechanism by which to connect the backpack battery 64 to the powerhead 30 without the undesirable tethering that otherwise necessarily occurs. FIG. 3 illustrates a block diagram of an example embodiment in which a battery adapter or battery adapter plate is used to eliminate the tethering result described above.

Of note, there are other ways to get power to the powerhead 30 from the backpack battery 64 instead of using the dummy battery 68. For example, some embodiments may use the cord 66 to plug the backpack battery 64 directly into a connector port separate from the battery receptacle or otherwise associated with the powerhead 30, or by integrating a connector to the backpack harness 62. Thus, the dummy battery 68 is just one method by which to transfer power from the backpack battery 64 to the powerhead 30, and other alternative connections can also be imagined. However, even in these alternatives, the cord 66 forms an undesirable tethering mechanism, as described above.

In the example of FIG. 3, it is assumed that the powerhead 30 is powered via a receptacle 100 that includes two battery pockets or receptacles. Thus, the onboard battery 32 is still usable for powering the powerhead 30 while an example embodiment is being employed. However, it should be appreciated that if the receptacle 100 instead only included a single battery pocket, the onboard battery 32 could be removed. Also, even when the receptacle 100 includes two battery pockets, it is possible to power the powerhead 30 from only one of the battery pockets and the other could remain empty.

Referring now to FIG. 3, the onboard battery 32 has a physical connection (shown as a solid line connector) to the receptacle 100, and the onboard battery 32 also has an electrical connection (shown by a dotted line connector) to the receptacle 100. The dummy battery 68 also has both physical and electrical connections to the receptacle 100. The receptacle 100 in turn has an electrical connection to the powerhead 30 to enable the powerhead 30 to receive electrical power from either or both of the onboard battery 32 and the backpack battery 64 (.e.g., via the dummy battery 68, as described in greater detail below, or via one of the alternative methods discussed above). The powerhead 30 then has a physical connection to a shaft 80 that is physically connected to the blade assembly 20 in order to turn the blades thereof. Each of the physical connections is shown by a solid line in FIG. 3.

Meanwhile, rather than having the cord 66 necessarily tether the operator and the backpack harness 62 to the lawn mower 10, example embodiments may employ the battery adapter 110 to support the backpack battery 64 locally at the lawn mower 10 (or powerhead 30). As noted above, the battery adapter 110 may alternatively be referred to as a battery adapter plate. Other alternative terms include backpack holder, backpack carrier, or backpack mounting part or device. In each case, the battery adapter 110 should not be confused with a backpack adapter, which is an alternative term for a dummy battery. In this regard, the battery adapter 110 is a structure that is used to enable the backpack battery 64 to be used to power the powerhead 30 without the tethering problem discussed above. In particular, for example, the backpack battery 64 can be removed from the battery harness 62 and mated with the battery adapter 110 locally at the powerhead 30. With the backpack battery 64 supported locally at the lawn mower 10, the cord 66 need only extend a short distance from the backpack battery 64 to the dummy battery 68 (or directly to a receptacle operably coupled to the powerhead 30), which is located nearby instead of far way. Thus, the cord 66 will not tether the operator 60 to the lawn mower 10 and, instead, only a short run of cord 66 would be needed so that, for example, excess cord could be tucked into a container volume, or wound onto an assembly configured to hold excess cord.

The battery adapter 110 may provide a physical connection to each of the backpack battery 64, and the powerhead 30. The physical connection may be either temporary, and require no tools to set up, or could be permanent (which may generally require tools). Thus, for example, the battery adapter 110 may include a physical interface that is specifically configured to mate with physical features on the powerhead 30 (or some part of the lawn mower 10) in either a temporary or permanent configuration. A specific example of a configuration for the battery adapter 110 is shown in FIGS. 4-8.

Figure 4:
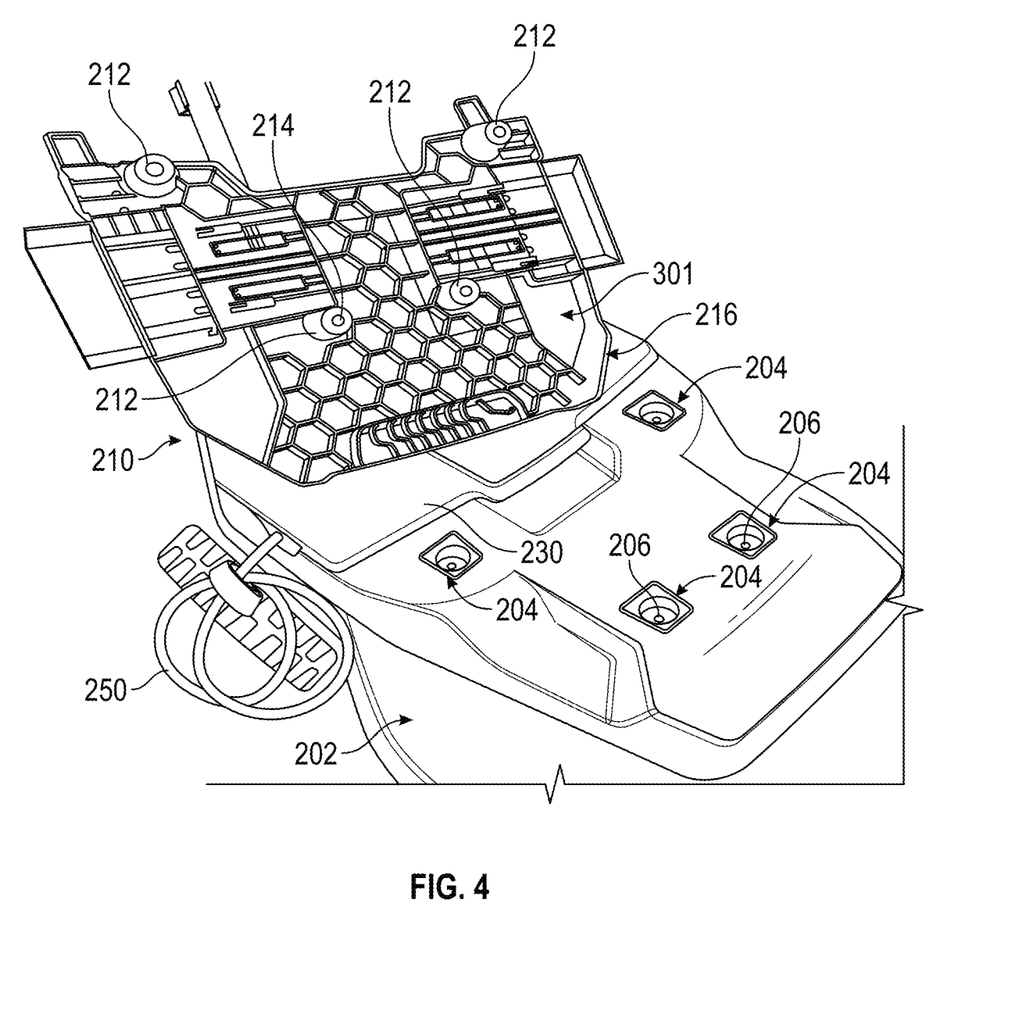
FIG. 4 illustrates a perspective view of a mower configured to interface with a battery adapter of an example embodiment.
Figure 5:
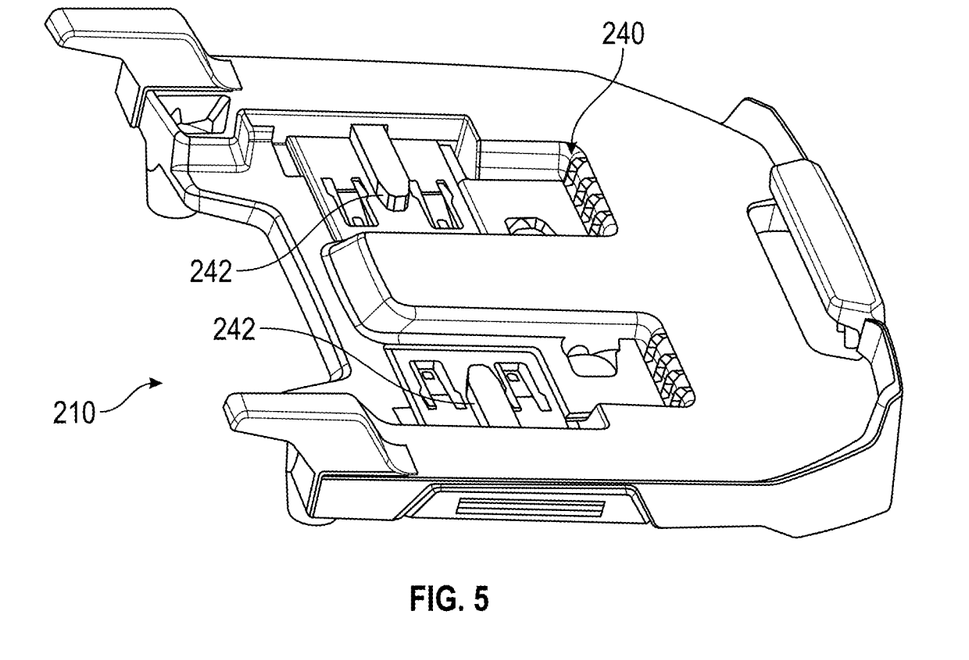
FIG. 5 illustrates a perspective view of a top side of the battery adapter in isolation in accordance with an example embodiment.
Figure 6:
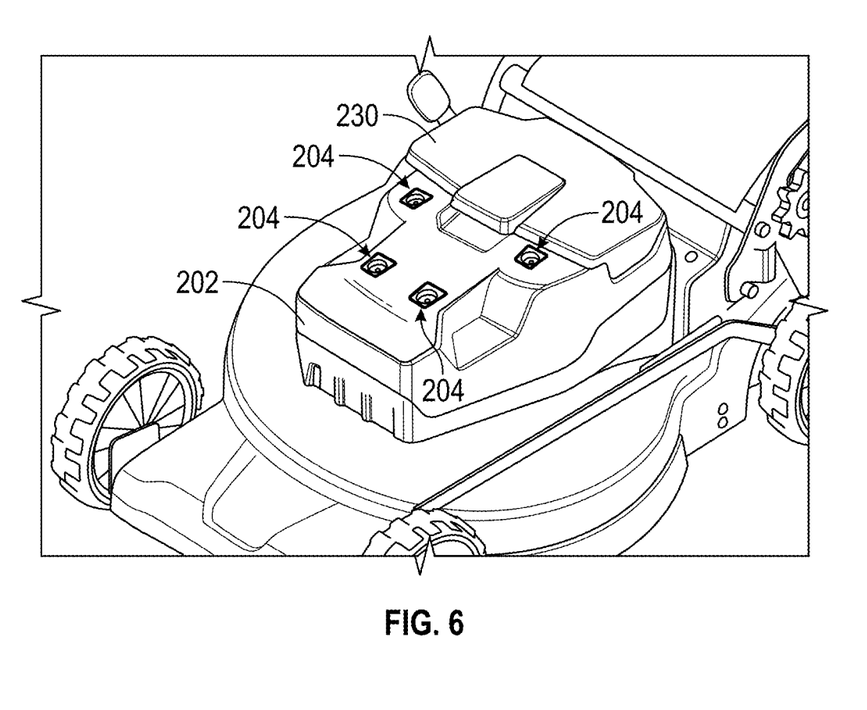
FIG. 6 illustrates a perspective view of the mower without the battery adapter installed in accordance with an example embodiment.
Figure 7:
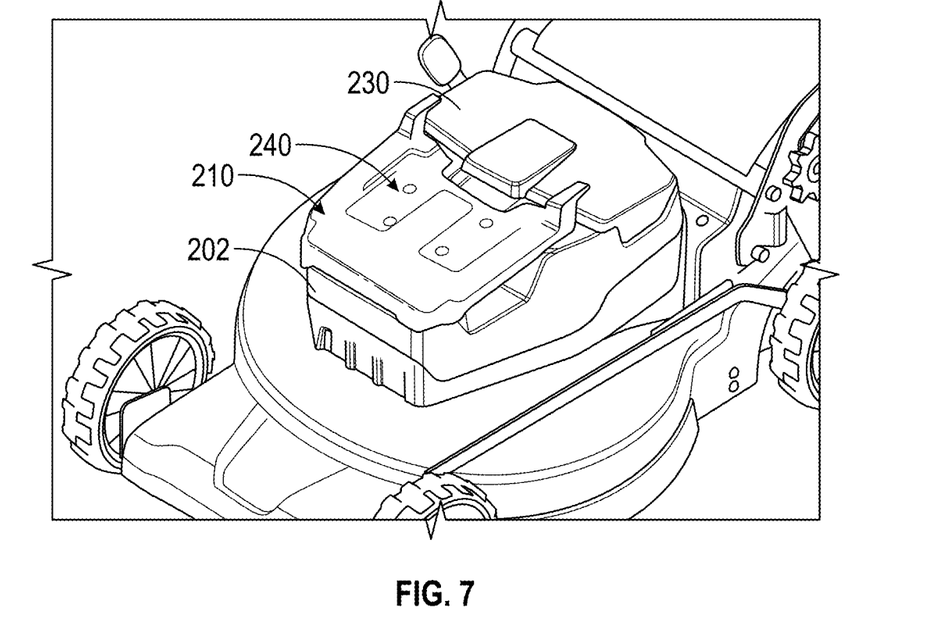
FIG. 7 illustrates a perspective view of the mower with the battery adapter installed in accordance with an example embodiment.
Figure 8:
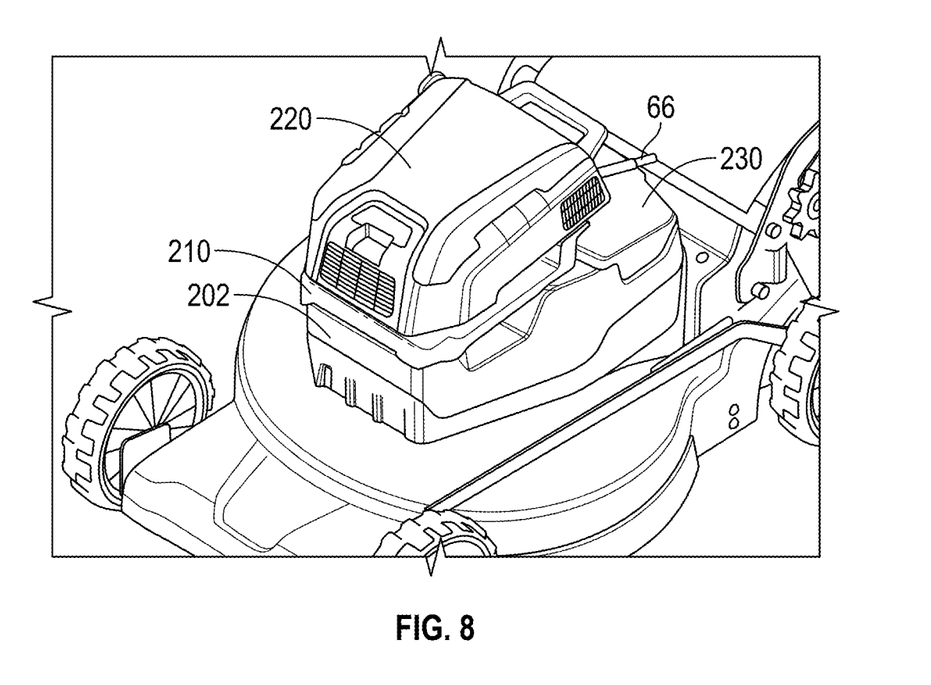
FIG. 8 illustrates a perspective view of the mower with the battery adapter installed and with a backpack battery mated with the battery adapter according to an example embodiment.

In this regard, FIG. 4 illustrates a perspective view of a mower 200 (which may be substantially similar in form and/or function to the lawn mower 10 described above) configured to interface with a battery adapter 210 (an example of battery adapter 110 of FIG. 2) of an example embodiment. The underside of the battery adapter 210, which is the side that faces the mower 200 when assembled, is also shown in FIG. 4. FIG. 5 illustrates a perspective view of a top side of the battery adapter 210 in isolation. FIG. 6 illustrates a perspective view of the mower 200 without the battery adapter 210 installed. FIG. 7 illustrates a perspective view of the mower 200 with the battery adapter 210 installed, and FIG. 8 illustrates a perspective view of the mower 200 with the battery adapter 210 installed and with a backpack battery 220 (e.g., an example of the backpack battery 64) mated with the battery adapter 210.

Referring now to FIGS. 4-8, the mower 200 may include a housing 202 having one or more mounting structures located at a top side thereof. The housing 202 may be a top surface or outer housing of the powerhead (e.g., powerhead 30) of the mower 200. The mounting structures may be embodied as recesses 204 that may, in some cases, include a threaded receiver 206 disposed therein. Meanwhile, the underside of the battery adapter 210 may also include mounting structures that are configured to mate with the mounting structures of the housing 202. The mounting structures of the battery adapter 210 may be, for example, mounting posts 212 that are configured to fit within or mate with the recesses 204. In some cases, the mounting posts 212 may be hollow in order to permit a fastener 214 to pass therethrough to engage the threaded receiver 206 of the housing 202 of the mower 200. In addition to having the mounting posts 212 configured to mate securely to the recesses 204 of the housing 202, an outer periphery 216 of the battery adapter 210 may be configured to conform to a top surface of the housing 202. Thus, the outer periphery 216 may also facilitate supporting the battery adapter 210 on the housing 202.

In some cases, the battery adapter 210 may simply be set on top of the housing 202 with the mounting posts 212 aligned with the recesses 204. The mounting posts 212 may be configured to fit relatively tightly into the recesses 204 to mate therewith. Thus, without the use of any tools at all, the battery adapter 210 can be placed onto the housing 202 and be mated therewith in a way that enables supporting the backpack battery 220 in the manner described herein. However, if a more permanent connection is desired, then the fasteners 214 in each respective mounting post 212 may be driven (e.g., with a powered or manual screw driver or wrench) into respective ones of the threaded receivers 206. It should also be appreciated that the mounting structures described above could be reversed (i.e., with posts extending upward from the housing 202 into recesses on the underside of the battery adapter 210) or modified in alternative embodiments.

As shown in FIGS. 4 and 6-8, the mower 200 may include a receptacle cover 230 that is configured to cover the receptacle (e.g., receptacle 100 of FIG. 3), in which a dummy battery (e.g., dummy battery 68) and/or one or two instances of the onboard battery 32 are placed. However, it should be appreciated that a dummy battery need not be employed in some cases, so the receptacle into which the backpack battery 220 plugs may be located in the receptacle and accessible via the receptacle cover 230 in some cases. The receptacle cover 230 may be rotatable (or otherwise removable) to provide access to the receptacle and the battery pockets located therein. Meanwhile, the battery adapter 210 is positioned proximate to (and in this case forward of) the receptacle cover 230 when operably coupled to the housing 202, and does not block access to the receptacle or otherwise inhibit operation of the receptacle cover 230 when the battery adapter 210 is either temporarily or permanently attached to the housing 202. FIG. 6 shows the battery adapter 210 installed onto the housing 202 adjacent to (and forward of) the receptacle cover 230.

After the battery adapter 210 is operably coupled to the housing 202 (either in the temporary or permanent configuration described above), the receptacle cover 230 may be opened and the dummy battery can be inserted into the receptacle, or the backpack battery 220 can otherwise be operably coupled to the powerhead 30 without use of the dummy battery, as mentioned above. As noted above, one instance of the onboard battery 32 may remain also in the receptacle, or the onboard battery 32 could be replaced by the dummy battery. In either case, the dummy battery may have contacts that electrically interface with and permit powering of the powerhead 30. After the dummy battery is installed into the receptacle, the receptacle cover 230 may be shut. The backpack battery 220 may then be physically disconnected from the backpack harness 62 and set on top of the battery adapter 210. The battery adapter 210 may include a backpack battery mating assembly 240 that is substantially similar in form and function to the mating assembly on the backpack harness 62. Thus, for example, mating structures 242 such as corresponding detents, protrusions, recesses, snap assemblies, latches, etc., may be employed between the backpack battery 220 and the mating structures 242 of the backpack battery mating assembly 240 in order to enable the backpack battery 220 to be affixed to the battery adapter 210. An operating lever, button, or other actuation assembly may be placed on the battery adapter 210 or (in most cases) on the backpack battery 220 to permit locking and unlocking of the connections and mating structures formed between the battery adapter 210 and the backpack battery 220.

The mounting structures on the underside of the battery adapter 210 may be referred to as a powerhead interface 301. The powerhead interface 301 may be configured to temporarily or permanently enable the battery adapter 210 to be fitted to and supported on the powerhead 30 (or housing 202) or some other part of the lawn mower 10. On the other side of the battery adapter 210 (i.e., the top side of the battery adapter 210), the backpack battery mating assembly 240 may act as a backpack battery interface. Both the powerhead interface 301 and the backpack battery interface may be formed to provide a relatively smooth transition from the housing 202 to the backpack battery 220. In this regard, the battery adapter 210 may be molded to conform to the shape of the housing 202 and the backpack battery 220.

When the backpack battery 220 is locked onto the battery adapter 210, the excess amounts of the cord 66 may be coiled up (see coiled cord 250 in FIG. 4) or otherwise stored in a manner that keeps the excess from dangling or otherwise creating a problem. Thus, for example, the excess amounts of the cord 66 may be coiled or stored in or proximate to the receptacle and the receptacle cover 230. In some cases, when the backpack battery 220 is locked onto the battery adapter 210, access to operate the receptacle cover 230 may be blocked. However, that is not necessarily the case and for some embodiments, the receptacle cover 230 may be operable even when the backpack battery 220 is locked onto the battery adapter 210. To disconnect the backpack battery 220 from the battery adapter 200, the operating lever, button or other actuation assembly of the backpack battery 220 may again be operated to release the mating structures 242 of the backpack battery mating assembly 240 from engagement with the backpack battery 220. The backpack battery 220 can then be lifted off of the battery adapter 210 and the receptacle cover 230 can be opened so that the dummy battery can be removed from the receptacle. The backpack battery 220 can then be reinstalled onto the backpack harness 62, and the dummy battery can be installed into another device for operation of the other device.

Accordingly, a lawn mower of an example embodiment may include a blade housing configured to house a blade assembly, a powerhead configured to selectively operate the blade assembly responsive to application of power from one or more batteries, a battery receptacle operably coupled to the powerhead and configured to receive the one or more batteries, and a battery adapter configured to be operably coupled to the lawn mower and to a backpack battery to enable the powerhead to receive power from the backpack battery in addition to or as an alternative to one of the one or more batteries when the backpack battery is removed from a backpack harness and mated with the battery adapter.

In some embodiments, the features described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the battery receptacle may include a receptacle cover, and the battery adapter may be disposed adjacent to the receptacle cover such that the receptacle cover is enabled to both open and close while the battery adapter is attached to the lawn mower. In an example embodiment, the battery adapter may include mating structures configured to interface with mating structures of the powerhead. In some cases, the mating structures of the battery adapter may include one or more mounting posts, and the mating structures of the powerhead may include a corresponding one or more recesses. In an example embodiment, each of the one or more mounting posts may be configured to enable a fastener to be secured therethrough into a threaded receptacle in the corresponding one or more recesses. In some cases, the battery adapter may include an outer periphery configured to conform to a top surface of the powerhead. In an example embodiment, the backpack battery may be operably coupled to a dummy battery via a cord, and the dummy battery may be disposed in the battery receptacle to replace one of the one or more batteries. In some cases, excess portions of the cord may be coiled or stored proximate to or inside the battery receptacle. In an example embodiment, the battery adapter may be disposed forward of and adjacent to the receptacle cover. In some cases, the battery adapter may include a powerhead interface on a first side thereof and a backpack battery interface on a second side thereof, which is opposite the first side, and the battery adapter may be molded to conform to a shape of the powerhead and the backpack battery. In an example embodiment, the lawn mower is a walk-behind lawn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
    a blade housing configured to house a blade assembly;
    a powerhead configured to selectively operate the blade assembly responsive to application of power from one or more batteries;
    a battery receptacle operably coupled to the powerhead and configured to receive the one or more batteries to provide power from the one or more batteries to the powerhead; and
    a battery adapter configured to be operably coupled to the lawn mower and to a backpack battery when the backpack battery is removed from a backpack harness and mated with the battery adapter,
    wherein the backpack battery is operably coupled to a dummy battery via a cord,
    wherein the dummy battery is disposed in the battery receptacle to provide power from the dummy battery to the powerhead simultaneously with the one or more batteries,
    wherein the battery receptacle comprises a receptacle cover,
    wherein the battery adapter is disposed adjacent to the receptacle cover such that the receptacle cover is enabled to both open and close while the battery adapter is attached to the lawn mower,
    wherein the battery adapter comprises a powerhead interface on a first side thereof and a backpack battery interface on a second side thereof, which is opposite the first side, and
    wherein the battery adapter is molded to conform to a shape of the powerhead and the backpack battery.

2. The lawn mower of claim 1, wherein the battery adapter comprises mating structures configured to interface with mating structures of the powerhead.

3. The lawn mower of claim 2, wherein the mating structures of the battery adapter include one or more mounting posts, and
    wherein the mating structures of the powerhead include a corresponding one or more recesses.

4. The lawn mower of claim 3, wherein each of the one or more mounting posts is configured to enable a fastener to be secured therethrough into a threaded receptacle in the corresponding one or more recesses.

5. The lawn mower of claim 3, wherein the battery adapter comprises an outer periphery configured to conform to a top surface of the powerhead.

6. The lawn mower of claim 2, wherein the battery adapter is configured to attach to the mating structures of the powerhead without tools.

7. The lawn mower of claim 1,
    wherein the dummy battery is disposed in the battery receptacle to replace one of the one or more batteries.

8. The lawn mower of claim 7, wherein the battery adapter is configured to retain excess portions of the cord coiled proximate to the battery receptacle.

9. The lawn mower of claim 7, wherein the dummy battery is disposed in the battery receptacle while the backpack battery is attached to the battery adapter and the cord is retained in the battery receptacle.

10. The lawn mower of claim 1, wherein the battery adapter is disposed forward of and adjacent to the receptacle cover.

11. The lawn mower of claim 1, wherein the lawn mower is a walk-behind lawn mower.

12. A battery adapter for battery powered, wheeled outdoor power equipment, the battery adapter comprising:
    a powerhead interface disposed on a first side of the battery adapter; and
    a backpack battery interface disposed on a second side of the battery adapter, which is opposite the first side,
    wherein the battery adapter is configured to be operably coupled to the outdoor power equipment and to the backpack battery to enable a powerhead of the outdoor power equipment to receive power from the backpack battery in addition to an onboard battery when the backpack battery is removed from a backpack harness and mated with the battery adapter,
- wherein the onboard battery is received by a battery receptacle operably coupled to the powerhead to provide power from the onboard batteries to the powerhead,
- wherein the battery adapter is disposed adjacent to a receptacle cover inside which the onboard battery is retained such that the receptacle cover is enabled to both open and close while the battery adapter is attached to the outdoor power equipment, and
- wherein the battery adapter is molded to conform to a shape of the powerhead and the backpack battery.

13. The battery adapter of claim 12, further comprising mating structures configured to interface with corresponding mating structures of the powerhead.

14. The battery adapter of claim 13, wherein the mating structures of the battery adapter include one or more mounting posts, and
- wherein the mating structures of the powerhead include a corresponding one or more recesses.

15. The battery adapter of claim 14, wherein each of the one or more mounting posts is configured to enable a fastener to be secured therethrough into a threaded receptacle in the corresponding one or more recesses.

16. The battery adapter of claim 14, further comprising an outer periphery configured to conform to a top surface of the powerhead.

17. The battery adapter of claim 12, wherein the backpack battery is operably coupled to a dummy battery via a cord, and
- wherein the dummy battery is disposed in the battery receptacle to replace the onboard battery.

18. The battery adapter of claim 17, wherein excess portions of the cord are coiled or stored proximate to or inside the battery receptacle.

19. The battery adapter of claim 12, wherein the battery adapter is disposed forward of and adjacent to the receptacle cover.

20. The battery adapter of claim 12, wherein the battery adapter is configured to attach to the powerhead without tools.

* * * * *

UNITED STATES PATENT AND TRADEMARK OFFICE
CERTIFICATE OF CORRECTION

| | |
|---|---|
| PATENT NO. | : 12,041,876 B2 |
| APPLICATION NO. | : 17/008790 |
| DATED | : July 23, 2024 |
| INVENTOR(S) | : Thomas Hermansson et al. |

It is certified that error appears in the above-identified patent and that said Letters Patent is hereby corrected as shown below:

On the Title Page

In Item (73), the Assignee, "HUSQVARNA" should read -- HUSQVARNA AB --

Signed and Sealed this
Third Day of December, 2024

Katherine Kelly Vidal
*Director of the United States Patent and Trademark Office*